US012801365B2

(12) United States Patent
Kollarapu et al.

(10) Patent No.: US 12,801,365 B2
(45) Date of Patent: Nov. 17, 2026

(54) SYSTEMS AND METHODS FOR MANAGING SOFTWARE COMPONENTS OF DATA PROCESSING SYSTEMS BASED ON COMPUTING RESOURCES

(71) Applicant: Dell Products L.P., Round Rock, TX (US)

(72) Inventors: Rajaravi Chandra Kollarapu, Allen, TX (US); Abeye Teshome, Austin, TX (US); Mohit Arora, Frisco, TX (US); Richard M. Tonry, Georgetown, TX (US); Luis Antonio Valencia Reyes, Waxahachie, TX (US); Bassem El-Azzami, Austin, TX (US); Vinodkumar Vasudev Ottar, McKinney, TX (US); Adolfo Sandor Montero, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 47 days.

(21) Appl. No.: 18/649,120

(22) Filed: Apr. 29, 2024

(65) Prior Publication Data

US 2025/0335171 A1 Oct. 30, 2025

(51) Int. Cl.
*G06F 8/61* (2018.01)
*G06F 21/60* (2013.01)

(52) U.S. Cl.
CPC .............. *G06F 8/62* (2013.01); *G06F 21/602* (2013.01)

(58) Field of Classification Search
CPC .. G06F 21/62; G06F 2221/2143; G06F 21/57; G06F 21/78; G06F 2009/45587; G06F 21/10; G06F 21/121; G06F 21/554; G06F 21/74
See application file for complete search history.

(56) References Cited

U.S. PATENT DOCUMENTS

| | | | |
|---|---|---|---|
| 8,042,182 | B2 | 10/2011 | Milani Comparetti et al. |
| 8,615,785 | B2 | 12/2013 | Elrod et al. |
| 8,924,620 | B2 | 12/2014 | Harriman et al. |
| 9,215,244 | B2 | 12/2015 | Ayyagari et al. |
| 9,734,169 | B2 | 8/2017 | Redlich et al. |
| 9,843,624 | B1 | 12/2017 | Taaghol |

(Continued)

OTHER PUBLICATIONS

Santos et al., "gym-hpa: Efficient Auto-Scaling via Reinforcement Learning for Complex Microservice-based Applications in Kubernetes", May 8, 2023, IEEE, NOMA 2023-2023 IEEE/IFIP Network Operations and Management Symposium (2023, pp. 1-9, 9 pages).

*Primary Examiner* — Olugbenga O Idowu
(74) *Attorney, Agent, or Firm* — WOMBLE BOND DICKINSON (US) LLP

(57) ABSTRACT

Methods and systems for managing operation of a data processing system are disclosed. To manage operations of the data processing system, removal instructions may be obtained by a management controller of the data processing system as part of a deprovisioning process for the data processing system. The removal instructions may include portions of data indicated for removal from the data processing system. A management controller of the data processing system may utilize the removal instructions to select a removal workflow and to perform the removal workflow to complete the removal instructions.

20 Claims, 6 Drawing Sheets

(56) References Cited

U.S. PATENT DOCUMENTS

| | | | | |
|---|---|---|---|---|
| 9,985,847 | B2 | 5/2018 | Tung | |
| 9,990,382 | B1 * | 6/2018 | Dias | G06F 16/178 |
| 10,176,308 | B2 | 1/2019 | Mintz et al. | |
| 10,298,670 | B2 | 5/2019 | Ben-Shael et al. | |
| 10,671,765 | B2 | 6/2020 | Swierk et al. | |
| 11,036,902 | B2 | 6/2021 | Nicholas | |
| 11,102,122 | B2 | 8/2021 | Seed et al. | |
| 11,134,380 | B2 | 9/2021 | Fox et al. | |
| 11,487,274 | B2 | 11/2022 | Valder et al. | |
| 11,792,267 | B2 | 10/2023 | Kreiner et al. | |
| 12,143,265 | B1 | 11/2024 | El-Azzami | |
| 2005/0066067 | A1 | 3/2005 | Suh | |
| 2011/0087387 | A1 | 4/2011 | Safa-Bakhsh et al. | |
| 2017/0230179 | A1 * | 8/2017 | Mannan | H04L 9/3226 |
| 2018/0039946 | A1 | 2/2018 | Bolte et al. | |
| 2019/0034382 | A1 | 1/2019 | Hargrave | |
| 2021/0034048 | A1 | 2/2021 | Hajizadeh | |
| 2021/0073211 | A1 | 3/2021 | Wright, Sr. | |
| 2021/0357255 | A1 | 11/2021 | Mahadik | |
| 2021/0385159 | A1 | 12/2021 | Memedagic | |
| 2022/0038659 | A1 | 2/2022 | Michel | |
| 2022/0207193 | A1 * | 6/2022 | Caraccio | G06F 21/554 |
| 2023/0199868 | A1 | 6/2023 | Kedalagudde | |
| 2025/0138936 | A1 | 5/2025 | Thiruchengode Vajravel | |

* cited by examiner

SYSTEMS AND METHODS FOR MANAGING SOFTWARE COMPONENTS OF DATA PROCESSING SYSTEMS BASED ON COMPUTING RESOURCES

FIELD

Embodiments disclosed herein relate generally to managing operations of data processing systems. More particularly, embodiments disclosed herein relate to systems and methods to manage deprovisioning processes for a data processing system of the data processing systems using at least out-of-band components.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
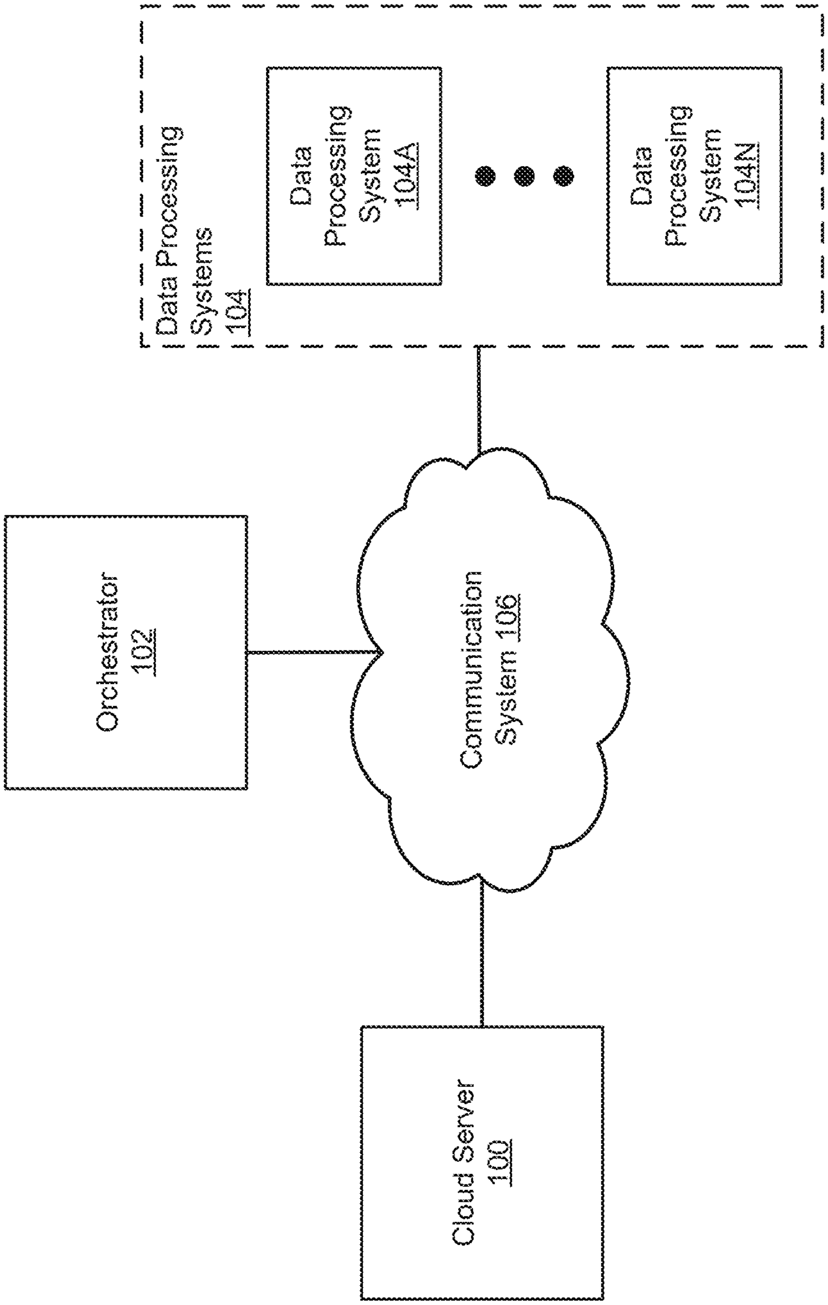
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. The data processing systems may provide computer-implemented services to any type and number of other devices and/or users of the data processing systems. The computer-implemented services may include any quantity and type of such services.

A request to decommission a data processing system may be initiated by an administrator or user of the data processing system. To decommission the data processing system may include removing (permanently deleting) portions of data stored by the data processing system. The data to be removed may include application data, sensitive data, for example, cryptographic information (e.g., certificate, keys, etc.) stored by a trusted platform module (TPM) hosted by the data processing system. To perform a decommissioning process, hardware resources of the data processing system may be turned on and an operating system of the data processing system may be required to connect to a network (e.g., communication channel associated with a server) in order to receive instructions to perform the decommissioning process.

For example, decommissioning a data processing system may include deactivating one or more entitlements for the data processing system (e.g., subscriptions purchased by a user of the data processing system). Deactivating the one or more entitlements may include an interaction between hardware components of the data processing system and a server. For example, an administrator or user of the data processing system may request removal or deletion of the one or more entitlements and the server may determine, via a lookup process in a database of entitlements for users, which entitlements to manage (e.g., remove and/or delete from the data processing system).

To manage entitlements, the server may provide instructions (e.g., for managing entitlements) to the data processing system using in-band components connected to a network shared with the server. However, providing the instructions via in-band components of the data processing system may not provide an adaptable solution in the event the hardware resources (e.g., including the in-band components) of the data processing system may not be functioning (e.g., powered off, failure of the components, etc.).

To execute the deprovisioning process, a management framework for the entitlements of the data processing system may be enforced that provides an ancillary side interaction via out-of-band components to modify portions of data stored on the data processing system. By doing so, the deprovisioning process may be implemented without utilizing an operating system of the data processing system and/or in the event that the in-band components of the data processing system are not functional (e.g., powered off). By doing so, modifications (e.g., removal of the portions of data) to the data processing system may be managed remotely (e.g., from a different geographically location from the data processing).

In an embodiment, a method of managing operation of a data processing system is provided. The method may include: obtaining, by a management controller of the data processing system and via an out-of-band channel, a removal instruction, the removal instruction being part of a deprovisioning process for the data processing system; identifying, by the management controller, a portion of data indicated for removal by the removal instruction; selecting, by the management, a removal workflow based on the portion of the data; performing, by the management controller and using at least a sideband channel between the management controller and hardware resources of the data processing system, the selected removal workflow to complete the removal instruction; and notifying, by the management controller and via the out-of-band channel, a requesting entity of completion of the removal instruction.

In an instance of the identifying where the portion of the data is stored by a trusted platform module of the hardware resources: performing the selected removal workload comprises: selectively powering, by the management controller, the trusted platform module; forwarding, by the management controller and via the side-band channel, at least a portion of the request to initiate removal of the portion of the data from the trusted platform module.

Performing the selected removal workload may also include: receiving, by the trusted platform module, a payload, signed using a private key of a public private key pair, indicating instruction to remove the portion of the data from the trusted platform module; performing, by the trusted platform module and using a public key of the public private key pair, a verification process to determine whether the payload is trustworthy; and based on performing the verification process, removing, by the trusted platform module, cryptographic data from the data processing system, the cryptographic data being based on the portion of the data; after the cryptographic data is removed, providing, by the trusted platform module to the management controller via the side-band channel, a notification indicating the removal of the portion of data is complete.

In an instance of the identifying where the portion of the data correspond to an application hosted by the hardware resources: performing the selected removal workload comprises: selectively powering, by the management controller, a storage device of the hardware resources; and storing, by the management controller and via the side-band channel, a data structure based on at least a portion of the request to initiate removal of the portion of the data from the storage device, the data structure being stored in a predetermined location known to a startup management entity that manages starts ups of the data processing system.

Performing the selected removal workload may also include: initiating, by the management controller, a startup of the data processing system; and identifying, by the startup management entity and during the startup, the data structure; removing, by the data startup management entity and based on the identification of the data structure, an application from the data processing system; and after the application is removed, handing off, by the startup management entity, management of the data processing system to an operation management entity.

The deprovisioning process may be initiated by a remote cloud server, the deprovisioning process may include managing entitlements for the data processing system that defined, at least in part, by an entitlement certificate obtained from an ownership voucher for the data processing system, the ownership voucher may include the entitlement certificate and at least one delegation of authority over the data processing system.

The removal instruction may indicate that at least a portion of the entitlement certificate has expired, the entitlement certificate may include: a payload indicating at least one entitlement for the data processing system; and a signature generated using a private key of a public private key pair maintained by an entity granting the at least one entitlement.

The method may also include: identifying, by a remote server, that a deprovisioning event for the data processing system has occurred; based identifying the deprovisioning event: identifying, by the remote server, a deprovisioning policy for the data processing system; applying, by the remote server, the deprovisioning policy to obtain the removal instruction; and providing, by the remote server, the removal instruction to, at least in part, deprovision the data processing system.

The data processing system may include a network module adapted to separately advertise network endpoints for the management controller and hardware resources of the data processing system, the network endpoints being usable by entities throughout the domain to address communications to the hardware resources using an in-band communication channel and the management controller using the out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
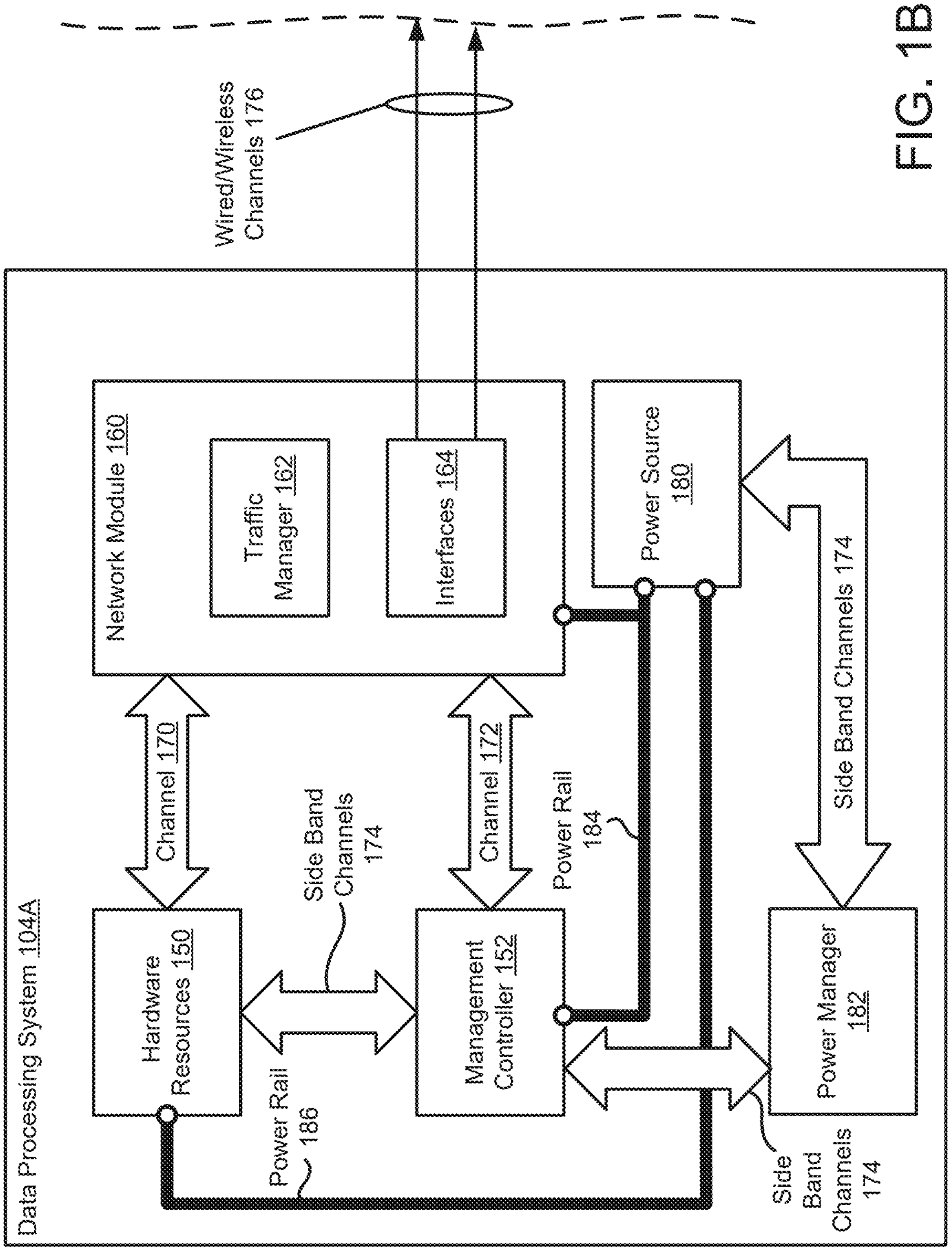
FIG. 1B shows a block diagram illustrating a data processing system in accordance with an embodiment.

Turning to FIG. 1A, a block diagram illustrating a system in accordance with an embodiment is shown. The system shown in FIG. 1A may provide for management of operations of data processing systems that may provide, at least in part, computer-implemented services. The system may include any number of data processing systems 104 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIG. 1B for additional details regarding data processing systems 104.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, cloud server 100, orchestrator 102, data processing systems 104, and/or any other type of devices (not shown in FIG. 1A). Other types of computer-implemented services may be provided by the system shown in FIG. 1A without departing from embodiments disclosed herein.

The computer-implemented services may be provided, at least in part, by hardware resources of data processing systems 104 and the computer-implemented services may be desired by a user of data processing systems 104. Providing the computer-implemented services may include managing entitlements of a data processing system of data processing systems 104 (e.g., 104A). For example, a computer implemented service provided by data processing system 104A may depend on the entitlements (e.g., subscriptions purchased by the user or administrator of the data processing system) that are active for data processing system 104A.

Thus, operation of and/or computer-implemented services provided by a data processing system (e.g., of data processing systems 104) may be modified (e.g., restricted) based on the active entitlements of the data processing system.

Part of the computer-implemented services may include, for example, deprovisioning the data processing system in the event of a change in ownership (e.g., a new owner or user of the data processing system). Deprovisioning the data processing system may include performing processes to remove access to applications, software, systems, and data within a network. For example, an administrator of data processing system (e.g., 104A) may revoke one or more subscriptions (e.g., a warranty, cloud storage, etc.), which may modify a list of entitlements for data processing system 104A. The list of the entitlements may change for other reasons (e.g., expiration of one or more subscriptions, end of life of the data processing system) without departing from embodiments disclosed herein.

In order to perform the deprovisioning process, a user or administrator (e.g., owner of the data processing system) may utilize an operating system of the data processing system to remove portions of data (e.g., including applications, certificates, cryptographic information, etc.). However, effectuating the modifications to the data processing system (e.g., removal of data) may require the data processing system (e.g., more specifically the hardware resources) to be powered on and the operating system of the data processing system to be fully booted up (e.g., prepared for operation) and connected to a network. As a result, delays in implementing the modifications may occur and, therefore, delays in the deprovision of computer-implemented services by data processing system 104A may occur.

In general, embodiments disclosed herein relate to systems, devices, and methods for managing operations of a data processing system during deprovisioning of the data processing system. To facilitate the deprovisioning process, the data processing system may include out-of-band components that may communicate with one another without traversing in-band communication channels and without utilizing in-band components. The out-of-band components may be utilized to execute selective removal workflows based on removal instructions as part of the deprovisioning process for the data processing system. For example, the out-of-band components may manage execution of modifications to the data processing system based on, at least in part, updates to entitlements for the data processing system.

By doing so, embodiments disclosed herein may facilitate remote management of deprovisioning of data processing systems. By using out-of-band components of the data processing system, the modifications (e.g., removal of data) for the data processing system may be implemented without utilizing an operating system of the data processing system and/or without dependence on the functionality of hardware resources of the data processing system. Thus, inoperable in-band components may be circumvented, decreasing the likelihood of potential obstacles hindering implementation of modifications to the data processing system, and/or increasing the likelihood of the data processing system providing desirable computer-implemented services to a user (e.g., deprovision of the data processing system).

To perform the above-mentioned functionality, the system of FIG. 1A may include cloud server 100, orchestrator 102, and/or data processing systems 104. Cloud server 100, orchestrator 102, data processing systems 104, and/or any other type of devices not shown in FIGS. 1A-1B may perform all, or a portion of the computer-implemented services independently and/or cooperatively. Each of these components is discussed below.

Data processing systems 104 may include any number and/or type of data processing systems (e.g., 104A-104N). Data processing systems 104 may provide desired computer-implemented services according to entitlements (e.g., subscriptions, services, etc.) of data processing systems 104. Managing entitlements for data processing systems 104 may include implementing limitations and/or removal of data from data processing systems 104, for example, during deprovisioning of data processing systems. When executing a deprovision process for any of data processing systems (e.g., 104A-104N), an administrator and/or user (e.g., of data processing systems 104) may rely on hardware resources of data processing systems 104 to be functional (e.g., powered on), and an operating system management tool (e.g., hosted by an operating system of a data processing system) to implement removal of data (e.g., cryptographic data, application data, etc.). If the operating system management tool is not fully booted up (e.g., turned on, functional, etc.) and/or connected to internet, then the deprovisioning of data processing systems 104 may not be executed.

To remove the dependency of functional hardware resources to initiate deprovisioning process, data processing systems 104 may include out-of-band components (e.g., a network module, a management controller, etc.) that functionally may allow data exchange between the out-of-band components independently from in-band components of data processing systems 104. For more information regarding out-of-band components of data processing systems 104, refer to the discussion of FIG. 1B.

The out-of-band components of data processing systems 104 may be utilized to perform removal workflows. To perform the removal workflows, the out-of-band components of data processing systems 104 may (i) obtain removal instructions (e.g., information delineating portions of data to remove from the data processing system), (ii) identify, based on the removal instructions, a portion of data (e.g., including applications, certificates, cryptographic keys, etc.) for removal, (iii) selecting a removal workflow based on the identified portion of data, (iv) performing the selected removal workflow (e.g., using at least side-band channels between the out-of-band components and the in-band components of data processing systems 104), (v) notifying a requesting entity of the completion of the removal instructions, and/or (vi) perform other actions relating to facilitating deprovisioning processes for data processing systems 104.

Cloud server 100 may include any number and/or type of servers (e.g., other data processing systems, management systems, storage devices, user devices, etc.) that may store and manage device registrations, entitlements, and/or other information related to data processing systems 104. For example, cloud server 100 may be a manufacturer of data processing systems 104, a warranty provider for data processing systems 104, and/or other entities. To perform its functionality, cloud server 100 may communicate (e.g., exchange data) with the out-of-band components of data processing system 104 using out-of-band communication channels. For example, cloud server 100 may provide removal instructions for data processing system 104A via a management controller of data processing system 104A (e.g., bypassing any in-band components of data processing system 104A).

Figure 2A:
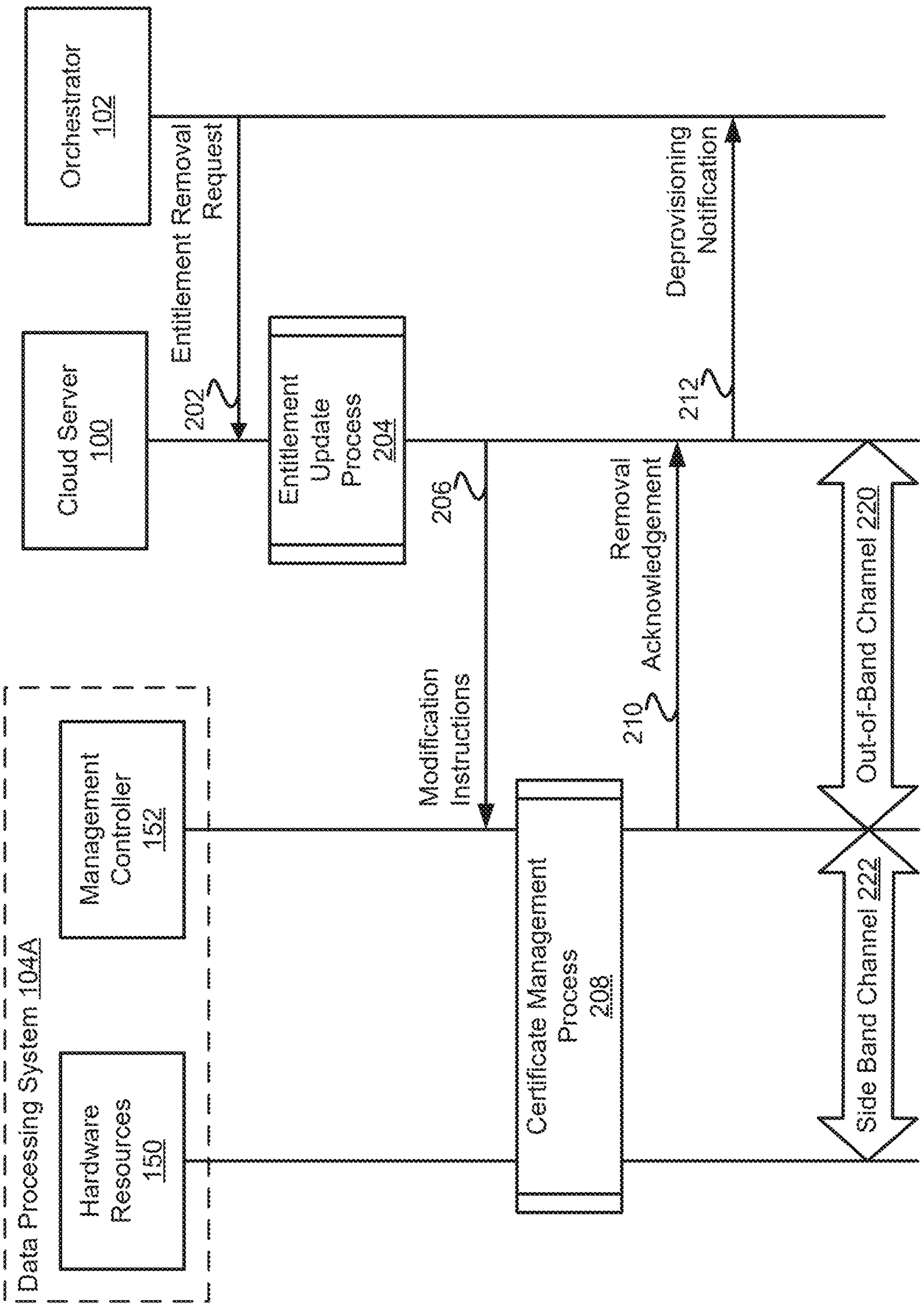
FIGS. 2A-2B show interaction diagrams in accordance with an embodiment.
Figure 2B:
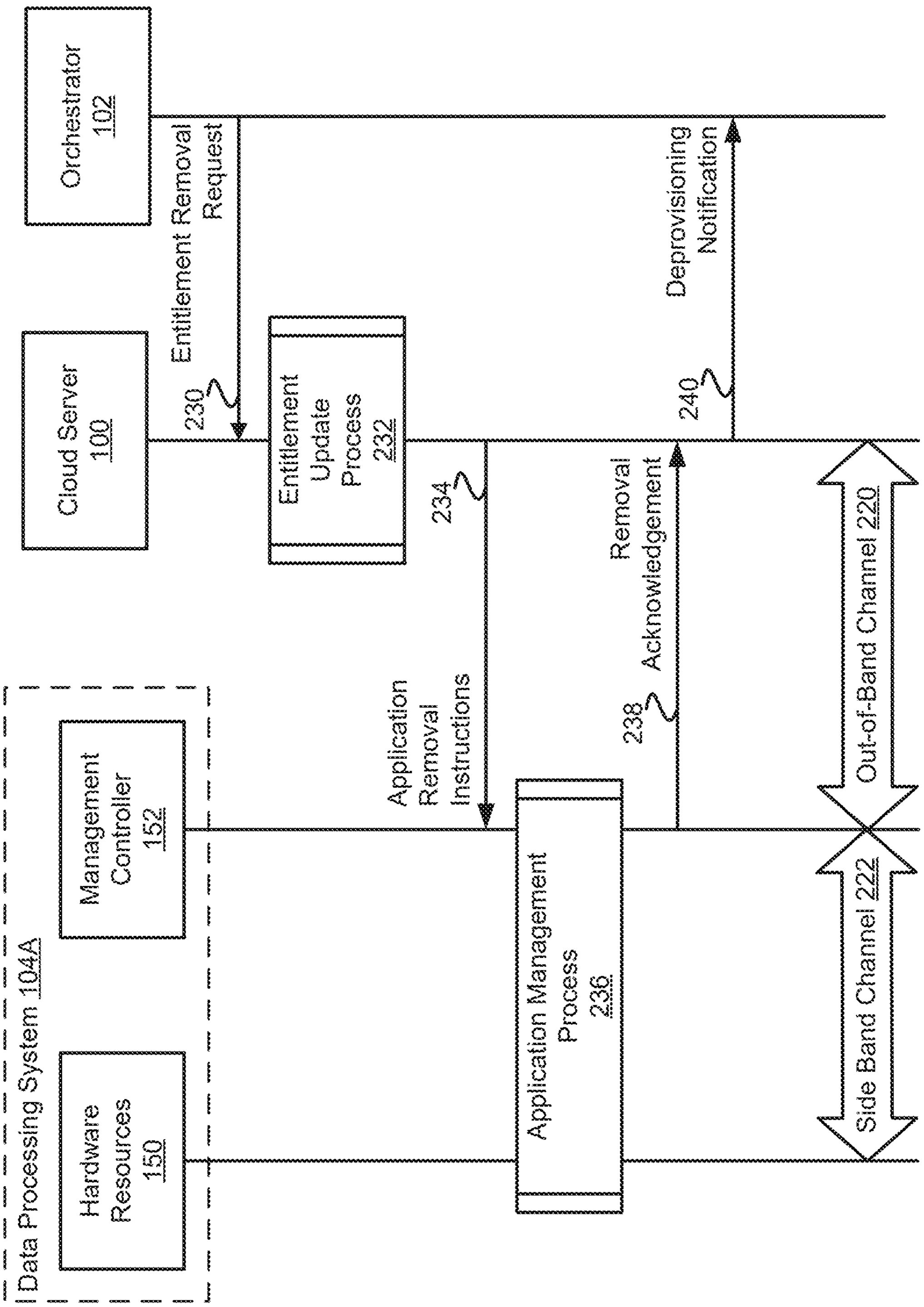

To provide management services, cloud server 100 may, for example, (i) receive a request to modify entitlements for data processing systems 104 (e.g., via an external entity), (ii) identify applicable policies for implementation of modification to entitlements, (iii) generate, based on the identified applicable policies, instructions for removal of portions of data from data processing systems 104, (iv) provide the removal instructions to the management controller (e.g., via out-of-band communication channels), (v) receive notifications from the management controller (e.g., via the out-of-band communication channels) regarding status of the completion of the removal instructions, and/or (vi) perform other actions that may facilitate entitlement management services. Refer to FIGS. 2A-2B for additional information regarding management of entitlements for data processing systems.

Orchestrator 102 may include any number and/or type of orchestrators (e.g., other data processing systems, user devices, etc.) that may participate in providing computer-implemented services, such as management services. Orchestrator 102 may also manage entitlement certificates for data processing systems 104 through transactions involving intermediate entities (e.g., re-sellers, new owners, etc.). To perform its functionality, orchestrator 102 may communicate requests (e.g., including entitlement change requests) to cloud server 100.

To provide management services, orchestrator 102 may, for example, (i) identify that a data processing system (e.g., 104A) needs to be deprovisioned, (ii) provide a request to cloud server 100 indicating modifications to entitlements for data processing system 104A, and/or (iii) perform other actions that may facilitate management services to be provided by data processing system 104A.

Thus, the operation of data processing systems 104 may be managed using out-of-band methods (e.g., using out-of-band components and via out-of-band communication channels). By doing so, implementing modifications to data processing systems 104 may be more likely to be managed in a timely manner, the amount of computing resources to implement the modifications may be decreased, and/or data processing systems 104 may be more likely to provide the desired computer-implemented services.

Refer to FIGS. 2A-2B for additional details regarding facilitating deprovisioning processes of data processing systems.

Figure 3:
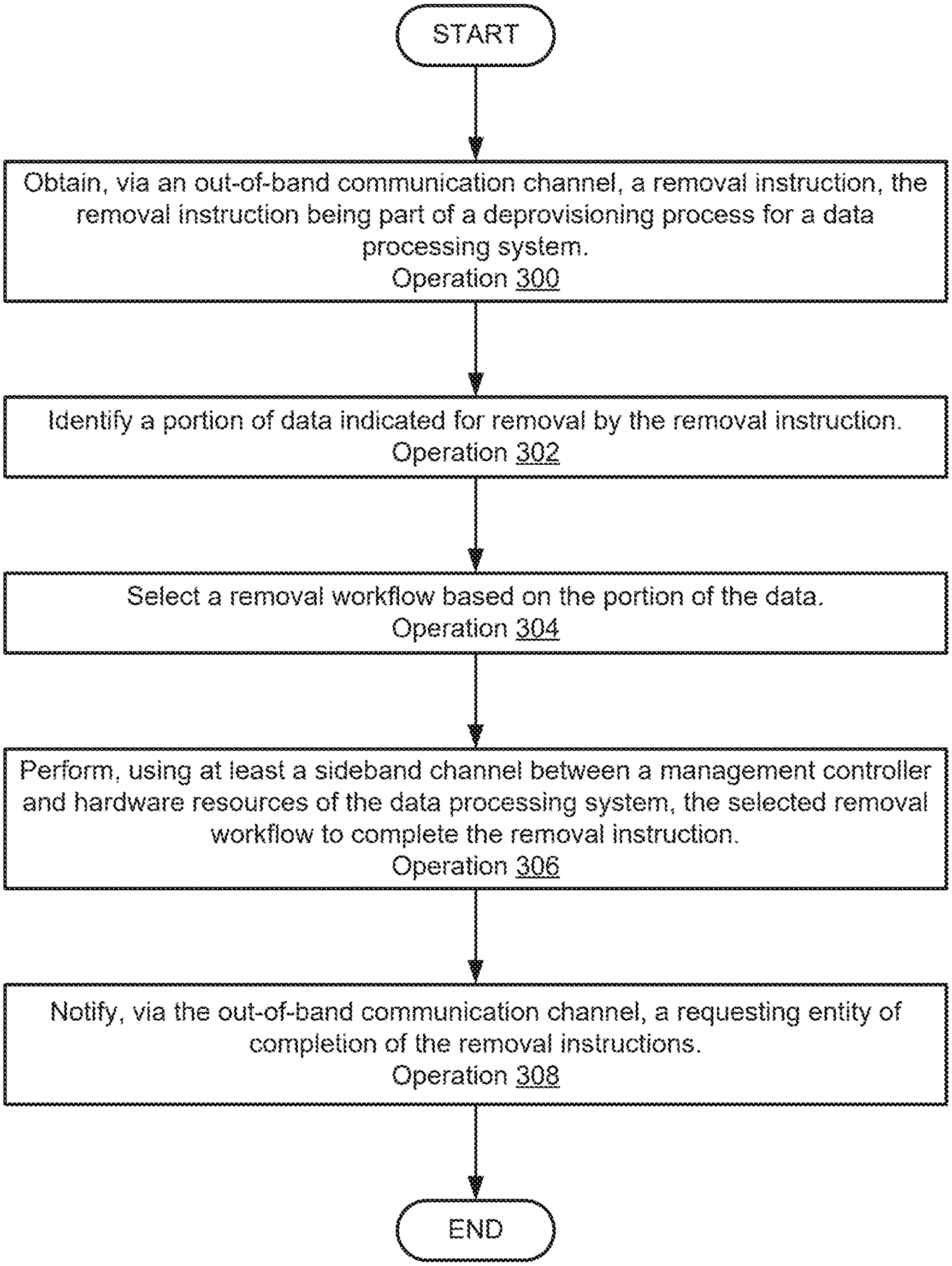
FIG. 3 shows a flow diagram illustrating a method of managing operations of a data processing system in accordance with an embodiment.

When providing their functionality, any of cloud server 100, orchestrator 102, and/or data processing systems 104 may perform all, or a portion, of the processes, interactions, and methods illustrated in FIGS. 2A-3.

Any of (and/or components thereof) cloud server 100, orchestrator 102, and/or data processing systems 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of cloud server 100, orchestrator 102, and/or data processing systems 104 are implemented using an internet of things (IoT) device, which may include a computing device. The IoT device may operate in accordance with a communication model and/or management model known to cloud server 100, orchestrator 102, data processing systems 104, and/or other devices.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of cloud server 100, orchestrator 102, data processing systems 104).

Communication system 106 may include out-of-band communication channels, in-band communication channels, and/or other types of communication channels.

While illustrated in FIG. 1A as including a limited number of specific components, a system in accordance with an embodiment may include fewer, additional, and/or different components than those illustrated therein.

Refer to FIG. 1B for additional details regarding the management controller, network module, out-of-band communication channel, and/or hardware resources of data processing systems 104.

Turning to FIG. 1B, a diagram illustrating data processing system 104A in accordance with an embodiment is shown. Data processing system 104A may be similar to any of data processing systems 104 shown in FIG. 1A.

To provide computer-implemented services, data processing system 104A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 104A) to another device via any number of intermediate networks (e.g., via wired/wireless channels 176 that are part of the networks).

In addition, different configurations of hardware resources 150 and/or software resources may be implemented by data processing system 104A based on the type of computer-implemented services that are to be provided. Modifications to configurations of hardware resources 150 and/or the software resources may lead to downtime for data processing system 104A and may consume network bandwidth of channel 170.

To reduce the downtime of data processing system 104A and to reduce the likelihood of the applications and/or other in-band entities from being indirectly compromised, data processing system 104A may include management controller 152 and network module 160. Each of these components of data processing system 104A is discussed below.

Management controller 152 may be implemented, for example, using a system on a chip or other type of independently operating computing device (e.g., independent from the in-band components, such as hardware resources 150, of a host data processing system 104A). Management controller 152 may provide various management functionalities for data processing system 104A. For example, management controller 152 may monitor various ongoing processes performed by the in-band component, may manage power distribution, thermal management, and/or other functions of data processing system 104A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 104A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 104A may include network module 160. Network module 160 may provide communication services for in-band components and out-of-band components (e.g., management controller 152) of data processing system. Specifically, an out-of-band communication channel (e.g., 172) that services management controller 152 and an in-band communication channel (e.g., 170) that services hardware resources 150 may run through network module 160. Network module 160 may host a TCP/IP stack to facilitate network communications via the out-of-band communication channel. To do so, network module 160 may include traffic manager 162 and interfaces 164.

Traffic manager 162 may include functionality to (i) discriminate traffic directed to various network endpoints advertised by data processing system 104A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

Specifically, network module 160 may separately advertise network endpoints for management controller 152 and hardware resources 150. The network endpoints may be usable by entities throughout a domain to which data processing system 104A is onboarded to address communications to hardware resources 150 using the in-band communication channel (e.g., 170) and management controller 152 using the out-of-band communication channel (e.g., 172).

To provide its functionality, management controller 152 may: (i) obtain, via an out-of-band communication channel (e.g., 172), a removal instruction, (ii) identify a portion of data indicated for removal by the removal instructions, (iii) select a removal workflow based on the portion of the data, (iv) perform, using at least a sideband channel (e.g., 174) between management controller 152 and hardware resources 150, the selected removal workflow to complete the removal instruction, (v) notify, via an out-of-band communication channel (e.g., 172), a requesting entity of completion of the removal instruction, and/or (vi) perform other actions.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in-band components and out-of-band components of data processing system 104A may appear to be two independent network entities, that may independently addressable, and otherwise unrelated to one another.

To facilitate management of data processing system 104A over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 104A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, components of data processing system 104A may perform all, or a portion, of the methods and operations illustrated in FIGS. 2A-3.

While illustrated in FIG. 1B with a limited number of specific components, a system may include additional, fewer, and/or different components without departing from embodiments disclosed herein.

As discussed above, the components of FIGS. 1A-1B may perform various methods to manage operation of a data processing system. FIGS. 2A-3 may illustrate examples of methods that may be performed by the components of FIGS. 1A-1B. For example, a management controller similar to management controller 152 may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, interactions diagrams in accordance with an embodiment are shown in FIGS. 2A-2B. These interactions diagrams may illustrate how data may be obtained and used within the system of FIGS. 1A-1B.

In the interaction diagrams, processes performed by and interactions between components of a system in accordance with an embodiment are shown. In the diagrams, components of the system are illustrated using a first set of shapes (e.g., hardware resources 150, management controller 152, etc.), located towards the top of each figure. Lines descend from these shapes. Processes performed by the components of the system are illustrated using a second set of shapes (e.g., entitlement update process 204, etc.) superimposed over these lines. Interactions (e.g., communication, data transmissions, etc.) between the components of the system are illustrated using a third set of shapes (e.g., 210, 212, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 210 may occur prior to the interaction labeled as 212. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate example processes and interactions that may occur during a removal workflow which may be performed to remove cryptographic data from a data processing system as part of a deprovisioning process of the data processing system.

To perform the removal workflow, at interaction 202, an entitlement removal request may be provided to cloud server 100 by orchestrator 102. For example, the entitlement removal request may be generated and provided to cloud server 100 via (i) transmission via a message, (ii) storing in a storage with subsequent retrieval by cloud server 100, (iii) via a publish-subscribe system where cloud server 100 subscribed to updates from orchestrator 102 thereby causing a copy of the entitlement removal request to be propagated to cloud server 100, and/or via other processes. By providing the entitlement removal request to cloud server 100, cloud server 100 may obtain a copy of the entitlement removal request and provide entitlement management services.

The entitlement removal request may include: (i) a payload indicating modifications to entitlements for the data processing system as part of a deprovisioning process, (ii) the identity of the data processing system, (iii) the identity of the requesting entity (e.g., orchestrator 102), and/or other data. For example, the entitlement removal request may indicate modification (e.g., removal, restriction, etc.) to at least a portion of an entitlement certificate for the data processing system.

In response to receiving the entitlement removal request, cloud server 100 may perform entitlement update process 204. During entitlement update process 204, cloud server 100 may identify applicable policies for managing operations of a data processing system (e.g., 104A) based on at least the entitlement removal request.

In response to receiving the entitlement removal request, cloud server 100 may perform entitlement update process 204. During entitlement update process 204, cloud server 100 may identify a deprovisioning event for a data processing system (e.g., 104A) based on at least the entitlement removal request and identify applicable policies for managing operations of the data processing system to obtain modification instructions to deprovision the data processing system.

For example, during entitlement update process 204, cloud server 100 may (i) identify entitlements for data processing system 104A (e.g., defined by an entitlement certificated obtained from an ownership voucher for the data processing system), (ii) identify deprovisioning policies applicable to data processing system 104A based on, at least in part, the entitlement removal request, (iii) applying the applicable deprovisioning policies to obtain modification instructions (e.g., removal instructions indicating removal of portions of data stored by the data processing system), and/or (iv) perform any other actions to manage entitlements for the data processing in order to facilitate deprovisioning of the data processing system.

The deprovisioning policies may be associated with different data processing systems and may define portions of data (e.g., application data, cryptographic data, etc.) that are to be removed from the respective data processing system as part of a deprovisioning process for the respective data processing system. For example, cloud server 100 may identify the applicable deprovisioning policies for data processing system 104A and generate modification instructions based on the deprovisioning policies.

Following entitlement update process 204 and at interaction 206, cloud server 100 may provide modification instructions to management controller 152 via out-of-band channel 220 (e.g., out-of-band communication channel described in FIG. 1B) and via a network endpoint associated with management controller 152.

For example, at interaction 206, the modification instructions may be generated and provided to management controller 152 via (i) transmission via a message, (ii) storing in a storage with subsequent retrieval by management controller 152, (iii) via a publish-subscribe system where management controller 152 subscribes to updates from cloud server 100 thereby causing a copy of the modification instructions to be propagated to management controller 152, and/or via other processes.

The modification instructions may include instructions to remove portions of data from data processing system 104A. For example, the modification instructions may include instructions to remove cryptographic data, such as certificates, cryptographic keys, etc., stored by a trusted platform module (not explicitly shown but may be represented by hardware resources 150). By providing the modification instructions to management controller 152, management controller 152 may obtain a copy of the modification instructions.

Once the modification instructions are obtained, management controller 152 and hardware resources 150 may cooperatively perform certificate management process 208 to remove cryptographic data (e.g., the portion of data to remove specified in the modification instructions) from data processing system 104A. To initiate certificate management process 208, management controller 152 may utilize the modification instructions to identify a portion of data to remove and select a removal workflow based on the identified portion of data for removal. For example, management controller 152 may identify the portion of data indicated for removal is stored by a trusted platform module "TPM" of the hardware resources (e.g., 150) hosted by data processing system 104A.

Certificate management process 208 may include: (i) selectively powering, by management controller 152, the trusted platform module (not explicitly shown but may be represented by hardware resources 150), (ii) forwarding, by management controller 152 and via side band channel 222, at least a portion of the request to initiate removal of the portion of the data from the trusted platform module, (iii) receiving, by the trusted platform module, a payload, indicating instruction to remove the portion of the data from the trusted platform module, (iv) performing, by the trusted platform module and using a public key of the public private key pair, a verification process to determine whether the payload is trustworthy, (v) based on performing the verification process, removing, by the trusted platform module, cryptographic data from data processing system 104A (e.g., based on at least the portion of data), and/or (vi) after the cryptographic data removed, providing, by the trusted platform module to management controller 152 via side band channel 222, a notification indicating the removal of the portion of data is complete.

Once the notification (e.g., indicating the removal of cryptographic data from the TPM is complete) is obtained, management controller 152 may, as part of certificate management process 208, selectively power off the TPM (e.g., using side band channel 222).

Following certificate management process 208, and at interaction 210, a removal acknowledgement may be provided to cloud server 100 by management controller 152 via out-of-band channel 220. For example, the removal acknowledgement may be provided to cloud server 100 via (i) transmission via a message, (ii) storing in a storage with subsequent retrieval by cloud server 100, (iii) via a publish-subscribe system where cloud server 100 subscribes to updates from management controller 152, and/or via other processes. By providing the removal acknowledgement to cloud server 100, cloud server 100 may receive confirmation that the modifications instructions have been completed.

At interaction 212, deprovisioning notification may be provided to orchestrator 102 by cloud server 100. For example, the deprovisioning notification may be provided to orchestrator 102 via (i) transmission via a message, (ii) storing in a storage with subsequent retrieval by orchestrator 102, (iii) via a publish-subscribe system where orchestrator 102 subscribes to updates from cloud server 100, and/or via other processes. By providing the deprovisioning notification to orchestrator 102, orchestrator 102 may receive confirmation that the deprovisioning process has been completed.

Thus, as shown in the example of FIG. 2A, entitlements for a data processing system (e.g., certificates, keys, etc.) may be managed using out-of-band methods during deprovisioning processes and status of the deprovisioning processes may be provided to the cloud server by the management controller.

While described above with respect to managing entitlements where a portion of data to remove from data processing systems may be cryptographic information (e.g., certificates, keys, etc.), it may be appreciated that managing entitlements may include cooperatively performing other processes to manage other entitlements for data processing systems.

Turning to FIG. 2B, a second interaction diagram in accordance with an embodiment is shown. The second interaction diagram may illustrate second example processes and interactions that may occur during management of entitlements including removal of applications of a data processing system for deprovisioning purposes.

To manage entitlements, at interaction 230, an entitlement removal request may be provided to cloud server 100 by orchestrator 102. The entitlement removal request may include a request to remove a portion of data including applications from data processing system 104A. For example, the entitlement removal request may be generated and provided to cloud server 100 via (i) transmission via a message, (ii) storing in a storage with subsequent retrieval by cloud server 100, (iii) via a publish-subscribe system where cloud server 100 subscribed to updates from orchestrator 102 thereby causing a copy of the entitlement removal request to be propagated to cloud server 100, and/or via other processes. By providing the entitlement removal request to cloud server 100, cloud server 100 may provide entitlement management services (e.g., entitlement update process 232).

Following receipt of the entitlement removal request, cloud server 100 may perform entitlement update process 232. During entitlement update process 232, cloud server 100 may identify applicable policies for managing operations of a data processing system (e.g., 104A) based on at least the entitlement removal request.

For example, during entitlement update process 232, cloud server 100 may (i) identify entitlements for data processing system 104A, (ii) identify deprovisioning processes applicable to data processing system 104A, (iii) generate removal instructions (e.g., information regarding removal of portions of data stored by data processing system 104A), and/or (iv) perform any other actions to facilitate implementation of the deprovisioning process.

Following entitlement update process 232 and at interaction 234, cloud server 100 may provide application removal instructions to management controller 152 via out-of-band channel 220 (e.g., out-of-band communication channel described in FIG. 1B) and via a network endpoint associated with management controller 152. For example, the application removal instructions may be provided to management controller 152 via (i) transmission via a message, (ii) storing in a storage with subsequent retrieval by management controller 152, (iii) via a publish-subscribe system where management controller 152 subscribes to updates from cloud server 100 thereby causing a copy of the application removal instructions to be propagated to management controller 152, and/or via other processes. By providing the application removal instructions to management controller 152, management controller 152 may cooperatively provide application removal services for data processing system 104A.

To provide application removal services, management controller 152 may perform application management process 236. During application management process 236, management controller 152 may cooperatively remove applications from hardware resources 150 of data processing system 104A. For example, management controller 152 may (i) identify the portion of the data corresponds to an application hosted by hardware resources 150, (ii) select a removal workload based on the identified portion of data, (iii) perform, using at least a sideband channel between management controller 152 and hardware resources 150, the selected removal workload, and/or (iv) perform other methods.

Identifying the portion of the data corresponding to an application hosted by hardware resources 150 may include reading (e.g., via a payload) the request to remove software resources pertaining to application data stored in hardware resources 150. For example, management controller 152 may identify the portion of the data (e.g., specified in the modification instructions) corresponds to applications hosted by hardware resources 150.

Selecting the removal workload may include, for example, utilizing the identified portion of data (e.g., corresponding to removal of applications hosted by hardware resources 150) to determine which component of hardware resources 150 may correspond to the identified portion of data in order to initiate removal of the portion of data.

Performing the selected removal workload may include (i) selectively powering, by management controller 152, a storage device (e.g., general purpose storage) of hardware resources 150, (ii) storing, by management controller 152 and via side-band channel 222, a data structure in the storage device of hardware resources 150, (iii) initiating, by management controller 152, a startup of data processing system 104A, (iv) identifying, by a startup management entity (not shown) during the startup process, the data structure (e.g., stored in the storage device of hardware resources 150), (v) removing, by the startup management entity, an application from hardware resources 150, (vi) after the application is removed, handing off, by the startup management entity, management of data processing system 104A to an operation management entity (e.g., operating system of data processing system 104A), and/or (vii) performing other methods.

The data structure stored in the storage device of hardware resources 150 may be stored in a predetermined location known to the startup management entity of data processing system 104A which may manage start ups of data processing system 104A.

Once confirmation of the removal of the application has been obtained, management controller 152 may, at interaction 238, provide a removal acknowledgement to cloud server 100 via out-of-band channel 220. For example, the removal acknowledgement may be provided to cloud server 100 via (i) transmission via a message, (ii) storing in a storage with subsequent retrieval by cloud server 100, (iii) via a publish-subscribe system where cloud server 100 subscribes to updates from management controller 152 thereby causing a copy of the removal acknowledgement to be propagated to cloud server 100, and/or via other processes. By providing the removal acknowledgement to cloud server 100, cloud server 100 may update entitlements for data processing system 104A to reflect the removal of the application from hardware resources 150 of data processing system 104A.

Once the removal acknowledgment is obtained, at interaction 240, a deprovisioning notification may be provided to orchestrator 102 by cloud server 100. For example, the deprovisioning notification may be provided to orchestrator 102 via (i) transmission via a message, (ii) storing in a storage with subsequent retrieval by orchestrator 102, (iii) via a publish-subscribe system where orchestrator 102 subscribes to updates from cloud server 100 thereby causing a copy of the deprovisioning notification to be propagated to orchestrator 102, and/or via other processes. By providing the deprovisioning notification to orchestrator 102, orchestrator 102 may receive the status of the deprovisioning process regarding data processing system 104A.

Thus, as shown in the example of FIG. 2B, entitlements for a data processing system (e.g., applications) may be managed using out-of-band methods during deprovisioning processes and status of the deprovisioning processes may be provided to the cloud server by the management controller.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, via processes and interactions shown in FIGS. 2A-2B, management controller 152 may facilitate removal of one or more entitlements (e.g., subscriptions) for data processing system 104A and may provide notifications regarding the removal of the one or more entitlements to cloud server 100 to manage operation of data processing system 104A using the out-of-band communication channel.

As discussed above, the components of FIGS. 1A-1B may perform various methods to manage data processing systems. FIG. 3 illustrates methods that may be performed by the components of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing operation of a data processing system in accordance with an embodiment is shown. The method may be performed, for example, by a management controller of the data processing system, and/or any other entity.

Prior to operation 300, a remote server may initiate a deprovisioning process to manage entitlements for the data processing system defined, at least in part, by an entitlement certificate obtained from an ownership voucher for the data processing system. To initiate the deprovisioning process, an occurrence of a deprovisioning event for a data processing system may be identified. The occurrence of the deprovisioning event may be identified by (i) receiving an indication that modifications to an entitlement certificate is initiated, (ii) receiving instruction to decommission the data processing system, and/or (iii) other methods. For example, an administrator of the data processing system may use a trusted device (e.g., personal computer) to input information indicating the initiation of deprovisioning the data processing system and provide the information to the remote server.

Based on identifying the deprovisioning event, the method may include: (i) identifying, by the remote server, a deprovisioning policy for the data processing system, (ii) applying, by the remote server, the deprovisioning policy to obtain the removal instruction, and/or (iii) providing, by the remote server, the removal instruction to, at least in part, deprovision the data processing system.

The deprovisioning policy for the data processing system may be identified by: (i) receiving the deprovisioning policy from an external entity, (ii) reading the deprovisioning policy from storage, and/or (iii) other methods.

The deprovisioning policy may be applied by: (i) performing an action set specified by the deprovisioning policy, (ii) providing the deprovisioning policy to an external entity in order to receive the removal instruction for the data processing system, and/or (iii) other methods.

The removal instruction to, at least in part, deprovision the data processing system may be provided by: (i) generating a data package including the removal instructions, (ii) providing the data package to the management controller via an out-of-band communication channel, and/or (iii) other methods.

At operation 300, a removal instruction may be obtained via an out-of-band communication channel. The removal instruction may be part of a deprovisioning process for a data processing system and may indicate that at least a portion of entitlement certificate (e.g., obtained from an ownership voucher for the data processing system) has expired. The removal instruction may be obtained by: (i) receiving, via the out-of-band communication channel, a notification from a remote cloud server, (ii) reading the removal instruction from storage, (iii) receiving the removal instruction from another entity, and/or (iv) other methods.

At operation 302, a portion of data indicated for removal by the removal instructions may be identified. The portion of data may be identified by: (i) reading the portion of data from the removal instructions, (ii) reading the portion of data from storage, and/or (iii) other methods.

At operation 304, a removal workflow may be selected based on the portion of the data. The removal workflow may be selected by: (i) identifying which component of the hardware resources corresponds to the identified portion of data, (ii) identifying procedures associated with the identified component of the hardware resources, and/or (iii) other methods.

At operation 306, the selected removal workflow may be performed to complete the removal instruction. The selected removal workflow may be performed using at least a side-band channel between a management controller and hardware resources of the data processing system.

In a first example, where in an instance of the identifying (e.g., at operation 302) where the portion of the data is stored by a trusted platform module of the hardware resources, performing the selected removal workload may include: (i) selectively powering, by the management controller, the trusted platform module, (ii) forwarding, by the management controller and via the sideband channel, at least a portion of the request to initiate removal of the portion of the data from the trusted platform module, (iii) receiving, by the trusted platform module, a payload, signed using a private key of a public private key pair, indicating instruction to remove the portion of the data from the trusted platform module, (iv) performing, by the trusted platform module and using a public key of the public private key pair, a verification process to determine whether the payload is trustworthy, (v) based on performing the verification process, removing, by the trusted platform module, cryptographic data from the data processing system, the cryptographic data being based on the portion of the data, and/or (vi) after the cryptographic data is removed, providing, by the trusted platform module to the management controller via the sideband channel, a notification indicating the removal of the portion of data is complete.

In a second example, where in an instance of the identifying (e.g., at operation 302) where the portion of data correspond to an application hosted by the hardware resources, performing the selected removal workload may include: (i) selectively powering, by the management controller, a storage device of the hardware resources, (ii) storing, by the management controller and via the side-band channel, a data structure based on at least a portion of the request to initiate removal of the portion of the data from the storage device, the data structure being stored in a predetermined location known to a startup management entity that manages starts ups of the data processing system, (iii) initiating, by the management controller, a startup of the data processing system, (iv) identifying, by the startup management entity and during the startup, the data structure, (v) removing, by the data startup management entity and based on the identification of the data structure, an application from the data processing system, and/or (vi) after the application is removed, handing off, by the startup management entity, management of the data processing system to an operation management entity.

At operation 308, a requesting entity may be notified of completion of the removal instructions using the out-of-band communication channel. The requesting entity may be notified by: (i) obtaining the notification, (ii) transmitting, via an out-of-band communication channel, the notification to the requesting entity, and/or (iii) other methods.

The method may end following operation 308.

Figure 4:
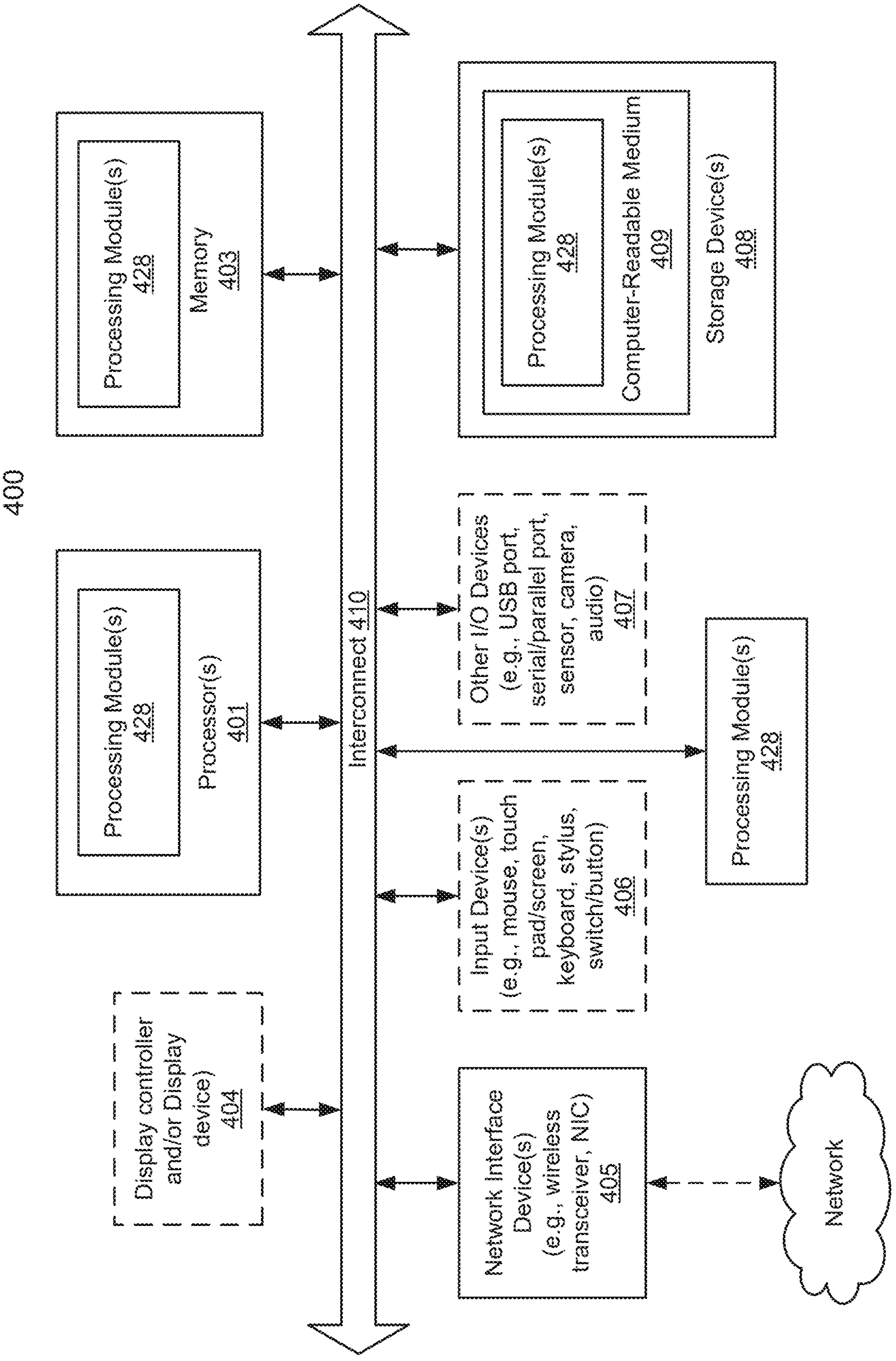
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

obtaining, by a management controller of the data processing system and from a requesting entity via an out-of-band communication channel configured within a chassis of the data processing system in which hardware resources of the data processing system are also installed, a removal instruction specifying a portion of data to be removed from the data processing system, the removal instruction being part of a deprovisioning process for the data processing system and are obtained by the management controller while the hardware resources are in a condition where the hardware resources are unable to receive the removal instruction, and the management controller being a system on a chip that is configured as a separate and independently operating computing device from the data processing system and that is physically installed within the chassis;

identifying, by the management controller and from within the hardware resources, the portion of data specified in the removal instruction;

selecting, by the management, a removal workflow based on the portion of data and a location of the portion of data within the hardware resources;

performing, by the management controller using a sideband channel between the management controller and the hardware resources and while a processor of the data processing system is unpowered such that an operating system hosted by the process is non-operational, the removal workflow that is selected to complete the removal instruction, wherein the data processing system further comprises only a single network module that is shared by both of the management controller and the hardware resources, the processor of the data processing system being one of the hardware resources and is separate from a processor of the management controller, the single network module is adapted to separately advertise network endpoints for the management controller and the hardware resources such that first communications meant for the hardware resources never flow through the management controller and second communications meant for the management controller never flow through the hardware resources, and the single network module is a network interface device of the data processing system that establishes remote communications including the first communications and the second communications between the data processing system and other devices remote to the data processing system; and notifying, by the management controller and via the out-of-band communication channel, the requesting entity of completion of the removal instruction.

2. The method of claim 1, wherein in an instance of the identifying where the portion of the data is stored by a trusted platform module of the hardware resources:

performing the selected removal workflow comprises:

selectively powering, by the management controller using a power manager that is connected to a power source of the data processing system and while the processor of the data processing system remains unpowered and the operating system remains non-operational, the trusted platform module, the power manager being installed within the chassis of the data processing system and the trusted platform module being separate from the processor of the data processing system; and forwarding, by the management controller and via the sideband channel, a request to initiate removal of the portion of the data from the trusted platform module.

3. The method of claim 2, wherein performing the selected removal workflow further comprises:

receiving, by the trusted platform module, a payload, signed using a private key of a public private key pair, indicating instruction to remove the portion of the data from the trusted platform module;

performing, by the trusted platform module and using a public key of the public private key pair, a verification process to determine whether the payload is trustworthy;

based on performing the verification process, removing, by the trusted platform module, cryptographic data from the data processing system, the cryptographic data being based on the portion of the data; and after the cryptographic data is removed, providing, by the trusted platform module to the management controller via the sideband channel, a notification indicating the removal of the portion of data is complete.

4. The method of claim 1, wherein in an instance of the identifying where the portion of the data corresponds to an application hosted by the hardware resources:

performing the selected removal workflow comprises:

selectively powering, by the management controller using a power manager that is connected to a power source of the data processing system and while the processor of the data processing system remains unpowered and the operating system remains non-operational, a storage device of the hardware resources, the power manager being installed within the chassis of the data processing system; and storing, by the management controller and via the sideband channel, a data structure based on the request to initiate removal of the portion of the data from the storage device, the data structure being stored in a predetermined location known to a startup management entity that manages start ups of the data processing system, the startup management entity being an input output basic system (BIOS) of the data processing system.

5. The method of claim 4, wherein performing the selected removal workflow further comprises, and after storing the data structure in the storage device:

powering on, by the management controller and using the power manager, the processor of the data processing system and other ones of the hardware resources to initiate a startup of the data processing system where the BIOS is booted up to manage the startup, the operating system being booted up as part of the BIOS managing the startup of the data processing system; and identifying, by the startup management entity and during the startup while the operating system is still booting up and non-operational, the data structure;

removing, by the startup management entity and based on the identification of the data structure, an application from the data processing system; and after the application is removed, handing off, by the startup management entity, management of the data processing system to the operating system that finished booting up after the BIOS has completed processes to be executed by the BIOS as part of managing the startup of the data processing system.

6. The method of claim 1, wherein the deprovisioning process is initiated by a remote cloud server, the deprovisioning process comprising managing entitlements for the data processing system that defined, at least in part, by an entitlement certificate obtained from an ownership voucher for the data processing system, the ownership voucher comprising the entitlement certificate and at least one delegation of authority over the data processing system.

7. The method of claim 6, wherein the removal instruction indicates that at least a portion of the entitlement certificate has expired, the entitlement certificate comprising:

a payload indicating at least one entitlement for the data processing system; and a signature generated using a private key of a public private key pair maintained by an entity granting the at least one entitlement.

8. The method of claim 7, further comprising:

identifying, by a remote server, that a deprovisioning event for the data processing system has occurred;

based on identifying the deprovisioning event:

identifying, by the remote server, a deprovisioning policy for the data processing system;

applying, by the remote server, the deprovisioning policy to obtain the removal instruction; and providing, by the remote server, the removal instruction to, at least in part, deprovision the data processing system.

9. The method of claim 1, wherein the network endpoints are used by a server to address the first communications to the hardware resources using an in-band communication channel and the second communications to the management controller using the out-of-band communication channel, and the single network module is directly connected to and can only communicate with the management controller via the out-of-band communication channel and being directly connected to and can only communicate with the hardware resources via the in-band communication channel, the in-band communication channel also being configured within the chassis.

10. The method of claim 9, wherein the management controller and the single network module are on separate power domains from the hardware resources so that the management controller and the single network module are operable while the hardware resources are inoperable.

11. The method of claim 9, wherein the out-of-band communication channel runs through the single network module, and the in-band communication channel that services the hardware resources also runs through the single network module.

12. The method of claim 9, wherein the single network module hosts a transmission control protocol/internet protocol (TCP/IP) stack to facilitate network communications via the out-of-band communication channel, the network communications being part of the remote communications.

13. A non-transitory machine-readable medium having instructions stored therein, which when executed by a processor, cause the processor to perform operations for managing operation of a data processing system, the operations comprising:

obtaining, by a management controller of the data processing system and from a requesting entity via an out-of-band communication channel configured within a chassis of the data processing system in which hardware resources of the data processing system are also installed, a removal instruction specifying a portion of data to be removed from the data processing system, the removal instruction being part of a deprovisioning process for the data processing system and are obtained by the management controller while the hardware resources are in a condition where the hardware resources are unable to receive the removal instruction, and the management controller being a system on a chip that is configured as a separate and independently operating computing device from the data processing system and that is physically installed within the chassis;

identifying, by the management controller and from within the hardware resources, the portion of data specified in the removal instruction;

selecting, by the management, a removal workflow based on the portion of data and a location of the portion of data within the hardware resources;

performing, by the management controller using a sideband channel between the management controller and the hardware resources and while a processor of the data processing system is unpowered such that an operating system hosted by the process is non-operational, the removal workflow that is selected to complete the removal instruction, wherein the data processing system further comprises only a single network module that is shared by both of the management controller and the hardware resources, the processor of the data processing system being one of the hardware resources and is separate from a processor of the management controller, the single network module is adapted to separately advertise network endpoints for the management controller and the hardware resources such that first communications meant for the hardware resources never flow through the management controller and second communications meant for the management controller never flow through the hardware resources, and the single network module is a network interface device of the data processing system that establishes remote communications including the first communications and the second communications between the data processing system and other devices remote to the data processing system; and notifying, by the management controller and via the out-of-band communication channel, the requesting entity of completion of the removal instruction.

14. The non-transitory machine-readable medium of claim 13, wherein in an instance of the identifying where the portion of the data is stored by a trusted platform module of the hardware resources:

performing the selected removal workflow comprises:

selectively powering, by the management controller using a power manager that is connected to a power source of the data processing system and while the processor of the data processing system remains unpowered and the operating system remains non-operational, the trusted platform module, the power manager being installed within the chassis of the data processing system and the trusted platform module being separate from the processor of the data processing system; and forwarding, by the management controller and via the sideband channel, a request to initiate removal of the portion of the data from the trusted platform module.

15. The non-transitory machine-readable medium of claim 14, wherein performing the selected removal workflow further comprises:

receiving, by the trusted platform module, a payload, signed using a private key of a public private key pair, indicating instruction to remove the portion of the data from the trusted platform module;

performing, by the trusted platform module and using a public key of the public private key pair, a verification process to determine whether the payload is trustworthy;

based on performing the verification process, removing, by the trusted platform module, cryptographic data from the data processing system, the cryptographic data being based on the portion of the data; and after the cryptographic data is removed, providing, by the trusted platform module to the management controller via the sideband channel, a notification indicating the removal of the portion of data is complete.

16. The non-transitory machine-readable medium of claim 13, wherein in an instance of the identifying where the portion of the data corresponds to an application hosted by the hardware resources:

performing the selected removal workflow comprises:

selectively powering, by the management controller using a power manager that is connected to a power source of the data processing system and while the processor of the data processing system remains unpowered and the operating system remains non-operational, a storage device of the hardware resources, the power manager being installed within the chassis of the data processing system; and storing, by the management controller and via the sideband channel, a data structure based on the request to initiate removal of the portion of the data from the storage device, the data structure being stored in a predetermined location known to a startup management entity that manages start ups of the data processing system, the startup management entity being an input output basic system (BIOS) of the data processing system.

17. A data processing system, comprising:

a processor; and a memory coupled to the processor to store instructions, which when executed by the processor, cause the processor to perform operations for managing operation of a data processing system, the operations comprising:

obtaining, by a management controller of the data processing system and from a requesting entity via an out-of-band communication channel configured within a chassis of the data processing system in which hardware resources of the data processing system are also installed, a removal instruction specifying a portion of data to be removed from the data processing system, the removal workflow that is selected being part of a deprovisioning process for the data processing system and are obtained by the management controller while the hardware resources are in a condition where the hardware resources are unable to receive the removal instruction, and the management controller being a system on a chip that is configured as a separate and independently operating computing device from the data processing system and that is physically installed within the chassis;

identifying, by the management controller and from within the hardware resources, the portion of data specified in the removal instruction;

selecting, by the management, a removal workflow based on the portion of data and a location of the portion of data within the hardware resources;

performing, by the management controller using a sideband channel between the management controller and the hardware resources and while a processor of the data processing system is unpowered such that an operating system hosted by the process is non-operational, the selected removal workflow to complete the removal instruction, wherein the data processing system further comprises only a single network module that is shared by both of the management controller and the hardware resources, the processor of the data processing system being one of the hardware resources and is separate from a processor of the management controller, the single network module is adapted to separately advertise network endpoints for the management controller and the hardware resources such that first communications meant for the hardware resources never flow through the management controller and second communications meant for the management controller never flow through the hardware resources, and the single network module is a network interface device of the data processing system that establishes remote communications including the first communications and the second communications between the data processing system and other devices remote to the data processing system; and notifying, by the management controller and via the out-of-band communication channel, the requesting entity of completion of the removal instruction.

18. The data processing system of claim 17, wherein in an instance of the identifying where the portion of the data is stored by a trusted platform module of the hardware resources:

performing the selected removal workflow comprises:

selectively powering, by the management controller using a power manager that is connected to a power source of the data processing system and while the processor of the data processing system remains unpowered and the operating system remains non-operational, the trusted platform module, the power manager being installed within the chassis of the data processing system and the trusted platform module being separate from the processor of the data processing system; and forwarding, by the management controller and via the sideband channel, a request to initiate removal of the portion of the data from the trusted platform module.

19. The data processing system of claim 18, wherein performing the selected removal workflow further comprises:

receiving, by the trusted platform module, a payload, signed using a private key of a public private key pair, indicating instruction to remove the portion of the data from the trusted platform module;

performing, by the trusted platform module and using a public key of the public private key pair, a verification process to determine whether the payload is trustworthy;

based on performing the verification process, removing, by the trusted platform module, cryptographic data from the data processing system, the cryptographic data being based on the portion of the data; and after the cryptographic data is removed, providing, by the trusted platform module to the management controller via the sideband channel, a notification indicating the removal of the portion of data is complete.

20. The data processing system of claim 17, wherein in an instance of the identifying where the portion of the data corresponds to an application hosted by the hardware resources:

performing the selected removal workflow comprises:

selectively powering, by the management controller using a power manager that is connected to a power source of the data processing system and while the processor of the data processing system remains unpowered and the operating system remains non-operational, a storage device of the hardware resources, the power manager being installed within the chassis of the data processing system; and storing, by the management controller and via the sideband channel, a data structure based on the request to initiate removal of the portion of the data from the storage device, the data structure being stored in a predetermined location known to a startup management entity that manages start ups of the data processing system, the startup management entity being an input output basic system (BIOS) of the data processing system.

* * * * *